United States Patent
Croak et al.

(10) Patent No.: US 8,594,128 B2
(45) Date of Patent: Nov. 26, 2013

(54) METHOD AND APPARATUS FOR ENABLING DYNAMIC PROTOCOL INTERWORKING RESOLUTION WITH DIVERSE ENDPOINTS

(75) Inventors: Marian Croak, Fair Haven, NJ (US); Hossein Eslambolchi, Los Altos Hills, CA (US)

(73) Assignee: AT&T Intellectual Property II, L.P., Atlanta, GA (US)

(*) Notice: Subject to any disclaimer, the term of this patent is extended or adjusted under 35 U.S.C. 154(b) by 1412 days.

(21) Appl. No.: 11/108,965

(22) Filed: Apr. 19, 2005

(65) Prior Publication Data

US 2006/0233159 A1    Oct. 19, 2006

(51) Int. Cl.
*H04L 29/06* (2006.01)

(52) U.S. Cl.
USPC ............ 370/467; 370/356; 370/401; 370/522

(58) Field of Classification Search
USPC ................. 370/384, 496, 401, 522, 352–356, 370/465–467; 709/230
See application file for complete search history.

(56) References Cited

U.S. PATENT DOCUMENTS

| | | | | |
|---|---|---|---|---|
| 5,835,574 A | * | 11/1998 | Lam | 379/90.01 |
| 6,111,893 A | * | 8/2000 | Volftsun et al. | 370/466 |
| 6,339,594 B1 | * | 1/2002 | Civanlar et al. | 370/352 |
| 6,987,756 B1 | * | 1/2006 | Ravindranath et al. | 370/352 |
| 2001/0046234 A1 | | 11/2001 | Agrawal | |
| 2002/0114318 A1 | * | 8/2002 | Rines | 370/352 |
| 2003/0167343 A1 | * | 9/2003 | Furuno | 709/244 |
| 2004/0022265 A1 | * | 2/2004 | Luz et al. | 370/466 |
| 2005/0141482 A1 | | 6/2005 | Kleiner | |
| 2005/0190743 A1 | * | 9/2005 | Marcu et al. | 370/352 |

FOREIGN PATENT DOCUMENTS

EP    1351478    10/2003

OTHER PUBLICATIONS

Schulzrinne et al., Session Initiation Protocol (SIP)-H.323 Interworking Requirements—draft-agrawal-sip-h323-interworking-reqs-06, Feb. 15, 2004, IETF.*
Rosenberg et al., RFC 3261—SIP: Session Initiation Protocol, Jun. 2002, IETF.*
Examiner's Report for CA 2,544,154, Aug. 18, 2009, copy consist of 4 pages.

* cited by examiner

Primary Examiner — Hoon J Chung

(57) ABSTRACT

A method and apparatus for enabling an edge component, e.g., a Border Element (BE), on a packet network to be endpoint aware is disclosed. Information contained in the BE regarding the endpoint enables it to consult stored protocol configurations that facilitate the dynamic resolution of interworking issues and adjust for service differences in endpoint support based on dynamic protocol interworking resolution.

20 Claims, 4 Drawing Sheets

METHOD AND APPARATUS FOR ENABLING DYNAMIC PROTOCOL INTERWORKING RESOLUTION WITH DIVERSE ENDPOINTS

The present invention relates generally to communication networks and, more particularly, to a method and apparatus for enabling dynamic protocol interworking resolution with diverse endpoints in packet networks, e.g. Voice over Internet Protocol (VoIP) networks.

BACKGROUND OF THE INVENTION

VoIP network services have to support a diversity of endpoints. These endpoints will support an array of protocols and service features. Each type of endpoint will have idiosyncratic parameters and service settings. For example, some IP PBXs support H.323 fast start, whereas others support H.323 slow start and yet others support Session Initiation Protocol (SIP) and so on. For example, terminal adaptors (TA) can support SIP or Media Gateway Control Protocol (MGCP).

Therefore, a need exists for a method and apparatus for enabling dynamic protocol interworking resolution with diverse endpoints in a packet network, e.g., a VoIP network.

SUMMARY OF THE INVENTION

In one embodiment, the present invention enables the edge component, the Border Element (BE), on the packet network to be endpoint aware. Broadly defined, a Border Element is a network element that represents the edge of the packet network, e.g., a VoIP network, and serves as a gateway between a customer's network, a packet network, and/or a Public Switched Telephone Network (PSTN). Information contained in the BE regarding the endpoint enables it to consult stored protocol configurations that facilitate the dynamic resolution of interworking issues and adjust for service differences in endpoint support based on dynamic protocol interworking resolution.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
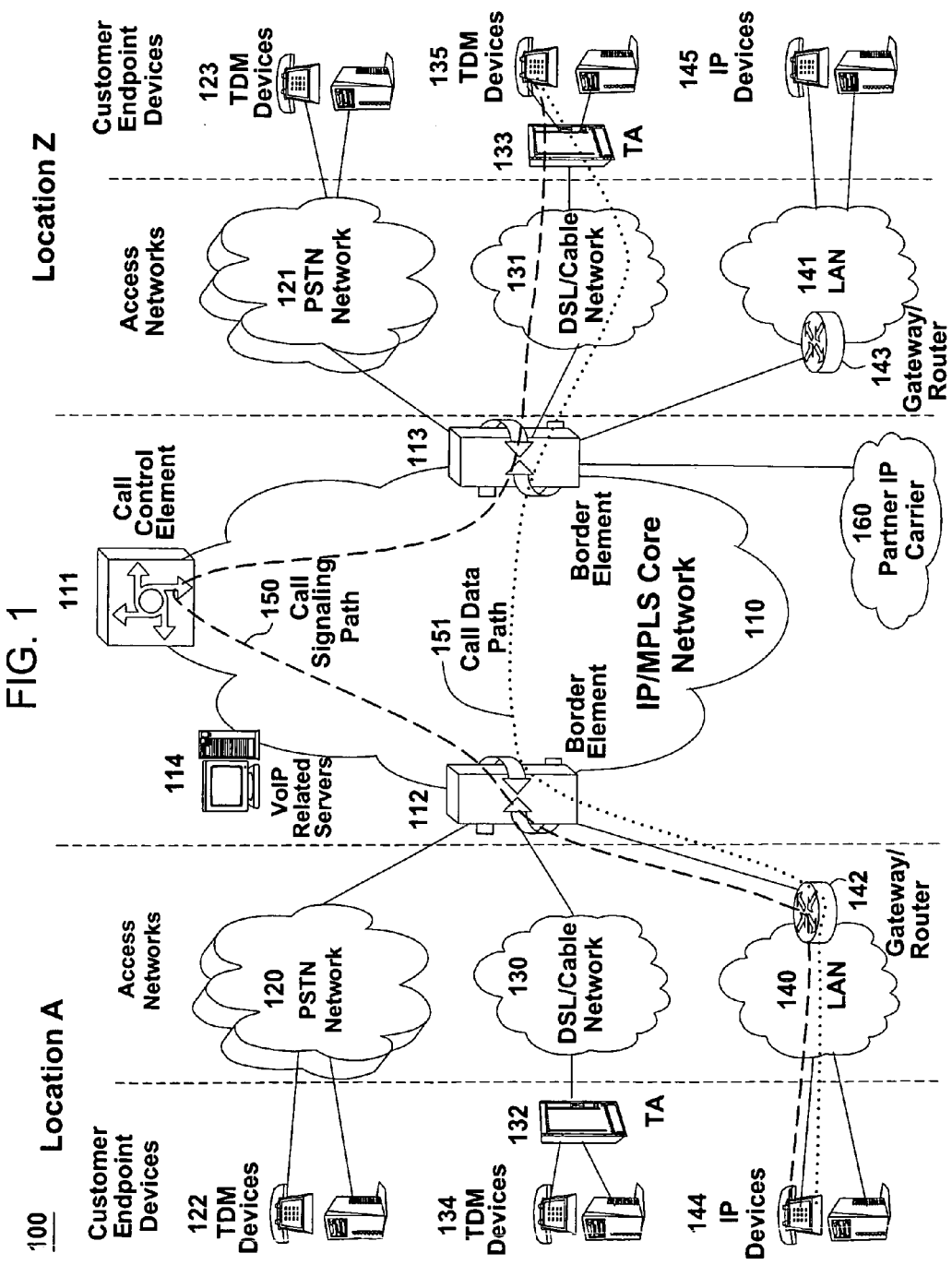
FIG. 1 illustrates an exemplary Voice over Internet Protocol (VoIP) network related to the present invention.

To better understand the present invention, FIG. 1 illustrates an example network, e.g., a packet network such as a VoIP network related to the present invention. Exemplary packet networks include internet protocol (IP) networks, asynchronous transfer mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted to be limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, and VoIP related servers 114. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related servers in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related server 114 to obtain the information to complete this call. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP-ACK message if SIP is used, is sent in the reverse direction back to the CCE 111. After the CCE 111 receives the call acknowledgement message, it will then send a call acknowledgement signaling message, such as a SIP-ACK message if SIP is used, toward the calling party. In addition, the CCE 111 also provides the necessary information of the call to both BE 112 and BE 113 so that the call data exchange can proceed directly between BE 112 and BE 113. The call signaling path 150 and the call data path 151 are illustratively shown in FIG. 1. Note that the call signaling path and the call data path are different because once a call has been setup up between two endpoints, the CCE 111 does not need to be in the data path for actual direct data exchange.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Packet network services, e.g., VoIP network services, have to support a diversity of endpoints. These endpoints will support an array of protocols and service features. Each type of endpoint will have idiosyncratic parameters and service settings. For example, some IP PBXs support International Telecommunications Union (ITU) H.323 fast start, whereas others support ITU H.323 slow start and yet others support Session Initiation Protocol (SIP) and the like. For example, terminal adaptors (TA) can support SIP or Media Gateway Control Protocol (MGCP).

To address this need, in one embodiment the present invention enables the edge component, the Border Element (BE), on the packet network, e.g., a VoIP network, to be endpoint aware. Broadly defined, a Border Element is a network element that represents the edge of a packet network and serves as a gateway between a customer's network, a packet network, and a Public Switched Telephone Network (PSTN). Information contained in the BE regarding the endpoint enables it to consult stored reference configurations that facilitate the dynamic resolution of interworking issues and adjust for service differences in endpoint support based on dynamic protocol interworking resolution.

Figure 2:
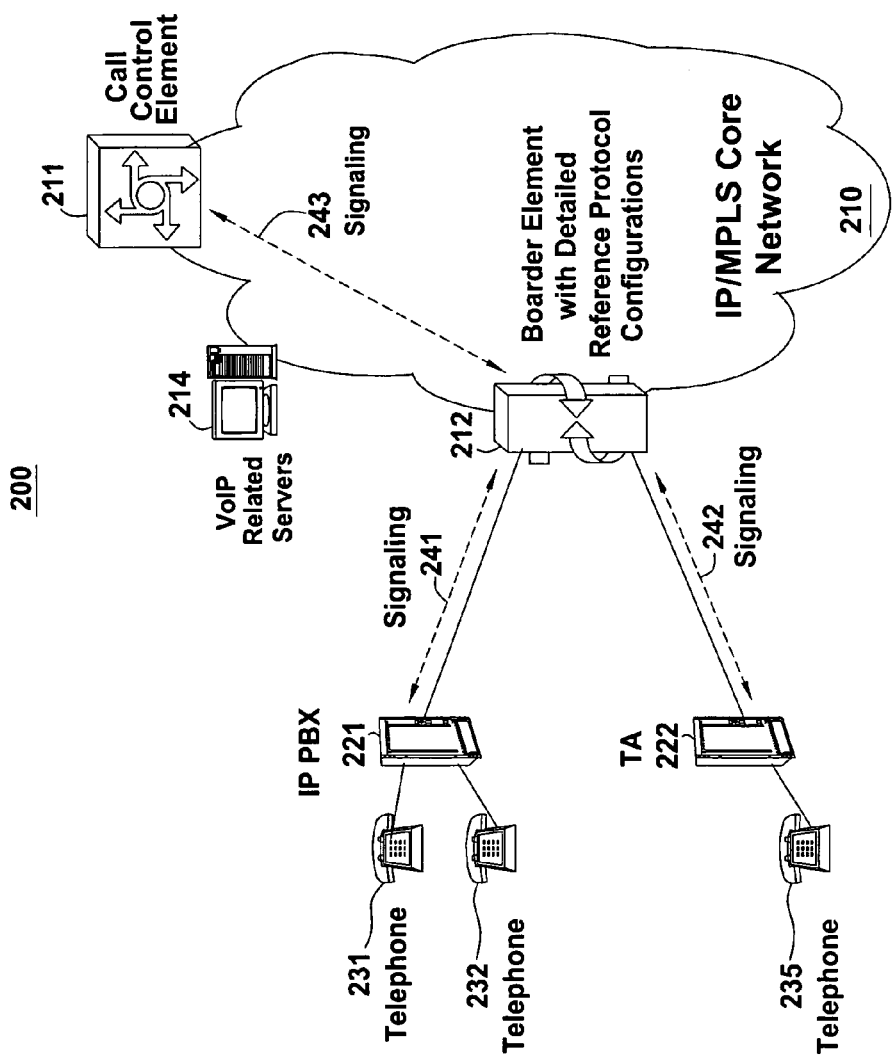
FIG. 2 illustrates an example of dynamic protocol interworking resolution with diverse endpoints in a VoIP network of the present invention.

FIG. 2 illustrates an example of dynamic protocol interworking resolution with diverse endpoints in a packet network, e.g., a VoIP network. In FIG. 2, the network first registers all the customer endpoints that are connected to the VoIP network. In particular, all customer endpoints connected to the Border Elements (BE) are registered with information of the type of endpoint device connected including, but is not limited to, the brand and model of the endpoint device and/or the protocol(s) supported by the endpoint device. BE 212 is connected with customer endpoint devices IP PBX 221 and TA 222. The network also stores detailed reference signaling configurations at BE 212 to allow interworking with the different types of customer endpoint devices that need to be supported at the edge of the network. For instance, reference signaling configurations include, but are not limited to, H.323 fast start, H.323 slow start, SIP version 2, SIP version 3, MGCP version 2, and MGCP version 3 configurations. The network then enables these stored detailed reference signaling protocol configurations at BE 212 to be used to support interworking with the different types of customer endpoint devices connected to BE 212. When a call is placed through IP PBX 221, IP PBX will signal, using flow 241, BE 212 to dynamically resolve the type of signaling protocol to be used to address a potential protocol conflict. For instance, IP PBX 221 may signal BE 212 to use H.323 fast start protocol configurations to support the incoming call. Similarly, when a call is placed through TA 222, TA 222 will signal, using flow 242, BE 212 to dynamically resolve the type of signaling protocol to be used. For instance, TA 222 may signal BE 212 to use MGCP version 3 protocol configurations to support the incoming call. Once the detailed signaling protocol has been determined, BE 212 will process the incoming signaling message, e.g., a call setup message, according to the negotiated signaling protocol from the detailed reference signaling protocol configurations that are stored. It should be noted that the signaling message is not limited to a call setup message. BE 212 will also perform the necessary signaling protocol conversion before sending the call setup message to CCE 211. For instance, if IP PBX 221 uses H.323 fast start protocol (e.g., a first protocol configuration) to setup a call, BE 212 will perform the protocol conversion for all signaling messages from IP PBX 221 from H.323 fast start to SIP (e.g., a second protocol configuration) before forwarding the converted or translated call signaling messages to CCE 211, using flow 243, in SIP format. Similarly, if TA 222 uses MGCP version 3 to setup a call, BE 212 will perform the protocol conversion for all signaling messages from TA 222 from MGCP version 3 to SIP before forwarding the converted call signaling messages to CCE 211, using flow 243, in SIP format.

Figure 3:
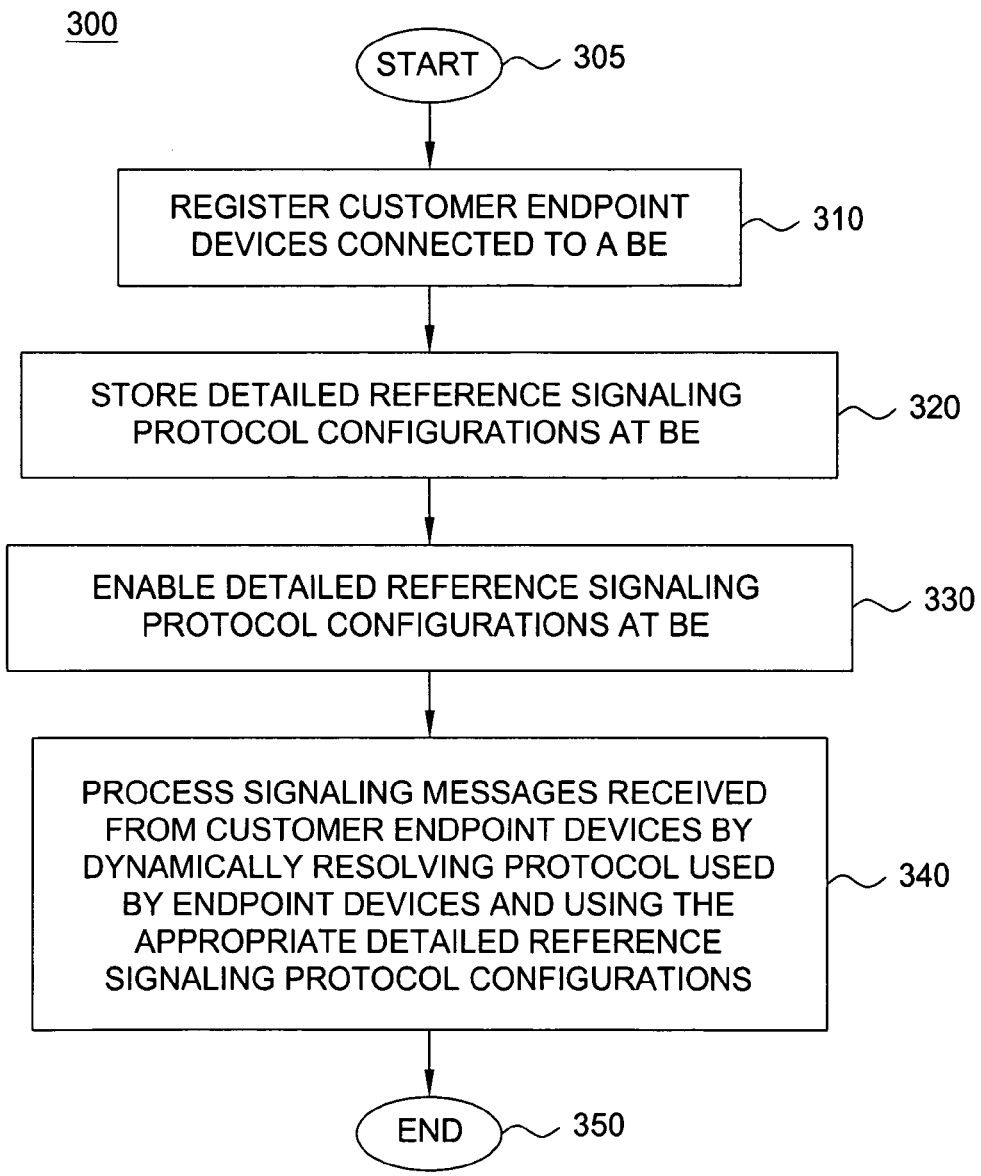
FIG. 3 illustrates a flowchart of a method for enabling dynamic protocol interworking resolution with diverse endpoints in a VoIP network of the present invention.

FIG. 3 illustrates a flowchart of a method 300 for enabling dynamic protocol interworking resolution with diverse endpoints in a packet network, e.g., a VoIP network. Method 300 starts in step 305 and proceeds to step 310.

In step 310, the method registers all customer endpoint devices connected to a Border Element at the edge of the VoIP network. The registration includes, but is not limited to, the type of endpoint device connected to the BE and/or the protocol configurations supported by the endpoint device.

In step 320, the method stores detailed reference signaling protocol configurations at the BE to allow interworking with the different types of customer endpoint that need to be supported at the edge of the network. For instance, reference signaling configurations include, but are not limited to, H.323 fast start, H.323 slow start, SIP version 2, SIP version 3, MGCP version 2, and MGCP version 3 configurations.

In step 330, the method 300 enables the stored detailed reference signaling protocol configurations at the BE to be used to support interworking with the different types of customer endpoint devices connected to the BE. In step 340, the method processes incoming calls to the BE using dynamic signaling protocol resolution to determine the type of signaling protocol to use to communicate with an endpoint device. Once the signaling protocol has been determined, the method processes incoming calls according to the resolved protocol and its detailed reference signaling protocol configurations already stored in the BE. For example, the method may perform protocol conversion between the resolved signaling protocol used to communicate with an endpoint device to and from the SIP signaling protocol used to communicate with the CCE of the VoIP network. The method ends in step 350.

Figure 4:
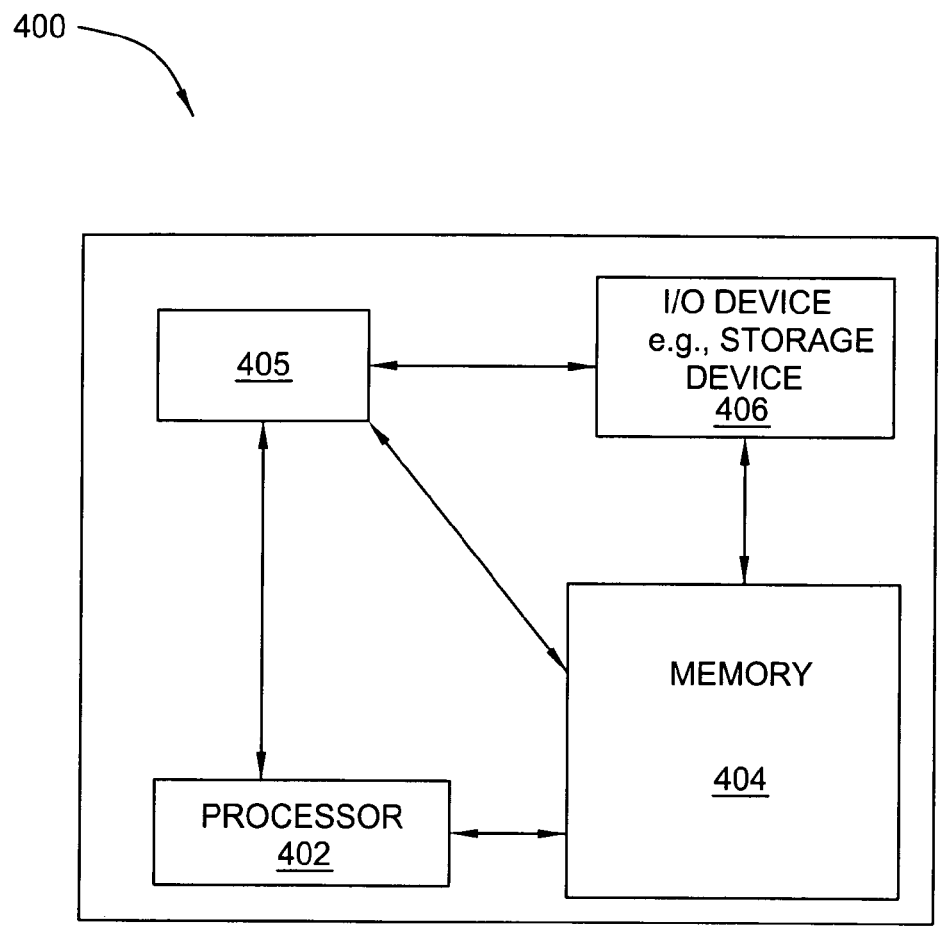
FIG. 4 illustrates a high level block diagram of a general purpose computer suitable for use in performing the functions described herein.

FIG. 4 depicts a high level block diagram of a general purpose computer suitable for use in performing the functions described herein. As depicted in FIG. 4, the system 400 comprises a processor element 402 (e.g., a CPU), a memory 404, e.g., random access memory (RAM) and/or read only memory (ROM), a dynamic protocol interworking resolution module 405, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present dynamic protocol interworking resolution module or process 405 can be loaded into memory 404 and executed by processor 402 to implement the functions as discussed above. As such, the present dynamic protocol interworking resolution process 405 (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for enabling dynamic protocol interworking in a communication network, comprising:
   registering all endpoint devices connected to a border element, wherein the registering comprises providing all protocols supported by each endpoint device of the all endpoint devices, wherein the protocols are internet protocol based protocols, wherein the border element resides at an edge in the communication network, and serves as a gateway for interacting with an access network and performs signaling and media control, wherein the communication network is a packet network;
   storing signaling protocol configurations at the border element based upon the all protocols to support interworking between each one of the all protocols that are registered;
   receiving a signaling message at the communication network, where the signaling message is generated by an endpoint device of the all endpoint devices connected to the communication network; and
   processing the signaling message from the endpoint device by dynamically resolving a protocol conflict at the border element of the communication network using one of the signaling protocol configurations stored in the border element.

2. The method of claim 1, wherein the communication network is an internet protocol network.

3. The method of claim 1, wherein the signaling protocol configurations comprise a session initiation protocol configuration, and a media gateway control protocol configuration.

4. The method of claim 1, wherein the processing comprises:
   negotiating a first signaling protocol configuration from the signaling protocol configurations to be used by the endpoint device and a second signaling protocol configuration from the signaling protocol configurations to be used by the communication network; and
   translating the signaling message in accordance with the first signaling protocol configuration into a translated signaling message in accordance with the second signaling protocol configuration.

5. The method of claim 1, wherein the endpoint device comprises a terminal adapter.

6. The method of claim 1, wherein the signaling message is a call setup signaling message.

7. The method of claim 1, wherein the endpoint device comprises an internet protocol private branch exchange.

8. The method of claim 1, wherein the signaling protocol configurations comprise at least two of: a session initiation protocol configuration, and a H.323 protocol configuration.

9. The method of claim 1, wherein the signaling protocol configurations comprise a media gateway control protocol configuration, and a H.323 protocol configuration.

10. A computer-readable non-transitory medium storing a plurality of instructions which, when executed by a processor, cause the processor to perform operations for enabling dynamic protocol interworking in a communication network, the operations comprising:
    registering all endpoint devices connected to a border element, wherein the registering comprises providing all protocols supported by each endpoint device of the all endpoint devices, wherein the protocols are internet protocol based protocols, wherein the border element resides at an edge in the communication network, and serves as a gateway for interacting with an access network and performs signaling and media control, wherein the communication network is a packet network;
    storing signaling protocol configurations at the border element based upon the all protocols to support interworking between each one of the all protocols that are registered;
    receiving a signaling message at the communication network, where the signaling message is generated by an endpoint device of the all endpoint devices connected to the communication network; and
    processing the signaling message from the endpoint device by dynamically resolving a protocol conflict at the border element of the communication network using one of the signaling protocol configurations stored in the border element.

11. The computer-readable non-transitory medium of claim 10, wherein the communication network is an internet protocol network.

12. The computer-readable non-transitory medium of claim 10, wherein the signaling protocol configurations comprise at least two of: a session initiation protocol configuration, a media gateway control protocol configuration, or a H.323 protocol configuration.

13. The computer-readable non-transitory medium of claim 10, wherein the processing comprises:
negotiating a first signaling protocol configuration from the signaling protocol configurations to be used by the endpoint device and a second signaling protocol configuration from the signaling protocol configurations to be used by the communication network; and
translating the signaling message in accordance with the first signaling protocol configuration into a translated signaling message in accordance with the second signaling protocol configuration.

14. The computer-readable non-transitory medium of claim 10, wherein the endpoint device comprises at least one of: a terminal adapter or an internet protocol private branch exchange.

15. The computer-readable non-transitory medium of claim 10, wherein the signaling message is a call setup signaling message.

16. An apparatus for enabling dynamic protocol interworking in a communication network, comprising:
a processor; and
a computer-readable medium storing a plurality of instructions which, when executed by the processor, cause the processor to perform operations, the operations comprising:
registering all endpoint devices connected to a border element, wherein the registering comprises providing all protocols supported by each endpoint device of the all endpoint devices, wherein the protocols are internet protocol based protocols, wherein the border element resides at an edge in the communication network, and serves as a gateway for interacting with an access network and performs signaling and media control, wherein the communication network is a packet network;
storing signaling protocol configurations at the border element based upon the all protocols to support interworking between each one of the all protocols that are registered;
receiving a signaling message at the communication network, where the signaling message is generated by an endpoint device of the all endpoint devices connected to the communication network; and
processing the signaling message from the endpoint device by dynamically resolving a protocol conflict at the border element of the communication network using one of the signaling protocol configurations stored in the border element.

17. The apparatus of claim 16, wherein the communication network is an internet protocol network.

18. The apparatus of claim 16, wherein the signaling protocol configurations comprise at least two of: a session initiation protocol configuration, a media gateway control protocol configuration, or a H.323 protocol configuration.

19. The apparatus of claim 16, wherein the processing comprises negotiating a first signaling protocol configuration from the signaling protocol configurations to be used by the endpoint device and a second signaling protocol configuration from the signaling protocol configurations to be used by the communication network, and translating the signaling message in accordance with the first signaling protocol configuration into a translated signaling message in accordance with the second signaling protocol configuration.

20. The apparatus of claim 16, wherein the endpoint device comprises at least one of: a terminal adapter or an internet protocol private branch exchange.

* * * * *